United States Patent [19]

Wishart

[11] Patent Number: 5,325,824
[45] Date of Patent: Jul. 5, 1994

[54] SPLIT CYCLE INTERNAL COMBUSTION ENGINE

[76] Inventor: John D. Wishart, 8 Chapel Street, Blackburn, Vic. 3130, Australia

[21] Appl. No.: 952,751
[22] PCT Filed: May 28, 1991
[86] PCT No.: PCT/AU91/00230
 § 371 Date: Nov. 27, 1992
 § 102(e) Date: Nov. 27, 1992
[87] PCT Pub. No.: WO91/19084
 PCT Pub. Date: Dec. 12, 1991

[30] Foreign Application Priority Data

May 29, 1990 [AU] Australia .............................. PK 0359

[51] Int. Cl.$^5$ .............................................. F02B 33/20
[52] U.S. Cl. ........................................ 123/72; 60/620;
 123/26; 123/301; 123/668
[58] Field of Search ................... 123/668, 669, 70 R,
 123/72, 301, 294, 26; 60/620

[56] References Cited

U.S. PATENT DOCUMENTS

| 1,500,464 | 7/1924 | Morrison | 123/669 |
| 3,408,811 | 11/1968 | Wishart | 60/620 |
| 4,786,561 | 2/1980 | Wishart | 60/620 |

FOREIGN PATENT DOCUMENTS 60-90955  5/1985  Japan ..................... 123/668

Primary Examiner—Noah P. Kamen
Attorney, Agent, or Firm—Frank P. Presta

[57] ABSTRACT

A split cycle internal combustion engine having located wholly within the combustion chamber (13) of the firing cylinder (10) and spaced from the walls thereof a hollow dome (14) with the closed head of the dome (14) adjacent to the head (11) of the firing cylinder (10) and the open base of the dome (14) nearer to the power piston (12), a nozzle (24) directing air from a compressor around the interior wall of the dome (14), nozzle (24) directing fuel into the dome (14) after all the air has entered the dome (14) and a nozzle (25) for igniting the fuel/air mixture when the temperature of the dome (14) is insufficiently high for ignition. An inwardly directed flange (17) extends around the open base of the dome (14) to form a channel (18). It is preferred that the engine operates at very high pressures, the compressor is multi-stage. An auxiliary power cylinder (29) of greater diameter than the firing cylinder (10) is provided, the auxiliary power cylinder (29) having a piston (30) connected to the same crankshaft as the power piston (12) and the compressor and reciprocating on a considerably later cycle than the power piston (12). A transfer port (28) connects the combustion zone (13) with the top of the cylinder (29) when the power piston (12) approaches bottom dead centre, and an exhaust valve (31) in the auxiliary power cylinder (29) opens as the auxiliary power piston (30) moves towards top dead centre.

4 Claims, 2 Drawing Sheets

SPLIT CYCLE INTERNAL COMBUSTION ENGINE

TECHNICAL FIELD

This invention relates to internal combustion engines in which compression is performed in compression cylinders maintained cold and combustion takes place in firing cylinders maintained hot, the compression and firing cylinders being physically separated. Compression pistons and power pistons reciprocate respectively within the compression and firing cylinders, all of the pistons being connected to a common crankshaft.

The pressures reached within the combustion chamber defined by the space between the crown of the power piston and the cylinder head are greater than those reached in engines operating on the Otto or diesel cycles. The engines of the above described construction are referred to hereinafter as "split cycle engines".

BACKGROUND ART

Split cycle engines have been described in my U.S. Pat. Nos. 3,408,811 and 4,186,561. It has been found in practical experience with engines of the construction described in U.S. Pat. No. 3,408,811 that the high gas pressures in the combustion chamber during ignition require higher electrical potentials to be applied to spark plugs than in conventional internal combustion engines, with the result that the spark plugs become unreliable.

It has for many years been known that ignition of the fuel-air mixture in an internal combustion engine of generally conventional construction, that is, in which the air and fuel mixture is compressed in the firing cylinder, can be achieved by heating a portion of the wall of the combustion chamber to provide a hot spot of sufficiently high temperature to ignite the mixture. Engines in which this method of ignition is employed are known as "hot bulb" or "semi diesel" engines. Such engines have been described in "Chambers Science and Technology Dictionary" published by W. & R. Chambers Ltd, 1974 Edition, page 582.

DISCLOSURE OF THE INVENTION

It is the principal object of the present invention to provide a split cycle engine wherein the use of spark plugs is eliminated.

In order to achieve this principal object, the present invention provides an internal combustion engine comprising a firing cylinder and a separate compressor comprising a compression cylinder having reciprocating therein respectively a power piston and a compression piston connected to a common crankshaft, the firing cylinder extending beyond the top limit of travel of the power piston to thereby include an unswept space constituting a combustion chamber, characterised by:

a hollow dome located wholly within the combustion chamber with the closed top of the dome adjacent to the head of the firing cylinder and the open base of the dome nearer to the power piston, said dome being spaced from the walls of the combustion chamber;

means directing a charge of air from the compressor around the interior wall of the dome;

means directing fuel separately from said air into the interior of the dome to mix with the air after all the air has entered the dome;

and means for igniting the fuel/air mixture when the temperature of the dome is insufficiently high for ignition.

Preferably, the dome has an inwardly directed flange around the open base to thereby form a channel around the interior of the dome.

It is preferred that the shape of the dome conform to the shape of the end region of the combustion chamber and be uniformly spaced from the walls of the combustion chamber.

It is further preferred that the compressor be a multistage compressor comprising a plurality of compression cylinders connected in series each having reciprocating therein a compression piston connected to the same crankshaft as the power piston.

More preferably, the engine comprises an auxiliary power cylinder of greater diameter than the first mentioned power cylinder, transfer means opening into the interior of the firing cylinder above bottom dead centre of the power piston and into the interior of the auxiliary power cylinder adjacent the top thereof, an auxiliary power piston reciprocating on a cycle later than the cycle of the power piston within the auxiliary power cylinder and connected to the same crankshaft as the first mentioned power piston and the compression pistons, and exhaust means venting the auxiliary power cylinder to atmosphere when the auxiliary power piston is moving toward top dead centre.

The dome is preferably made from heat resisting material, such as ceramic or heat-resisting metal.

The accompanying drawings illustrate the general lay-out of a split cycle engine, and practical arrangements of engines according to the present invention.

BEST MODE FOR CARRYING OUT THE INVENTION

Figure 1:
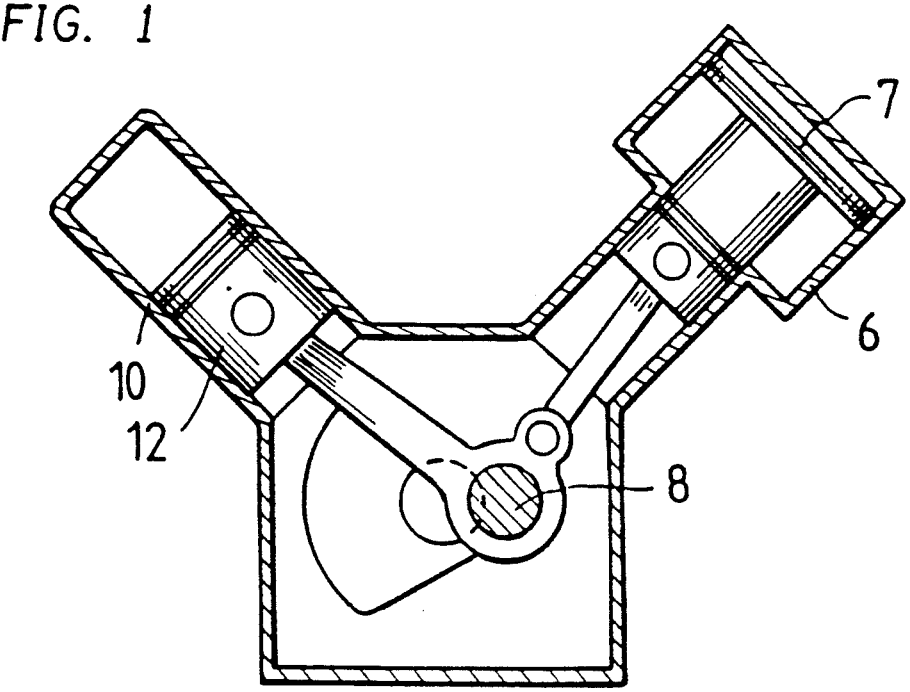
FIG. 1 is a schematic cross section showing the general arrangement of a split cycle engine.

Referring first to FIG. 1 of the drawings, which merely illustrates in a general way the meaning of the term "split cycle engine", a compressor comprises a compression cylinder 6 containing a reciprocating compression piston 7 driven from a crankshaft 8.

A firing cylinder 10 contains a reciprocating power piston 12 which is also connected to the crankshaft 8. Air compressed in the compressor is supplied to the firing cylinder 10, which also receives fuel. Ignition of the fuel/air mixture in the cylinder 10 produces power to rotate the crankshaft 8 and thereby compress further air in the compressor as well as providing usable external power.

Figure 3:
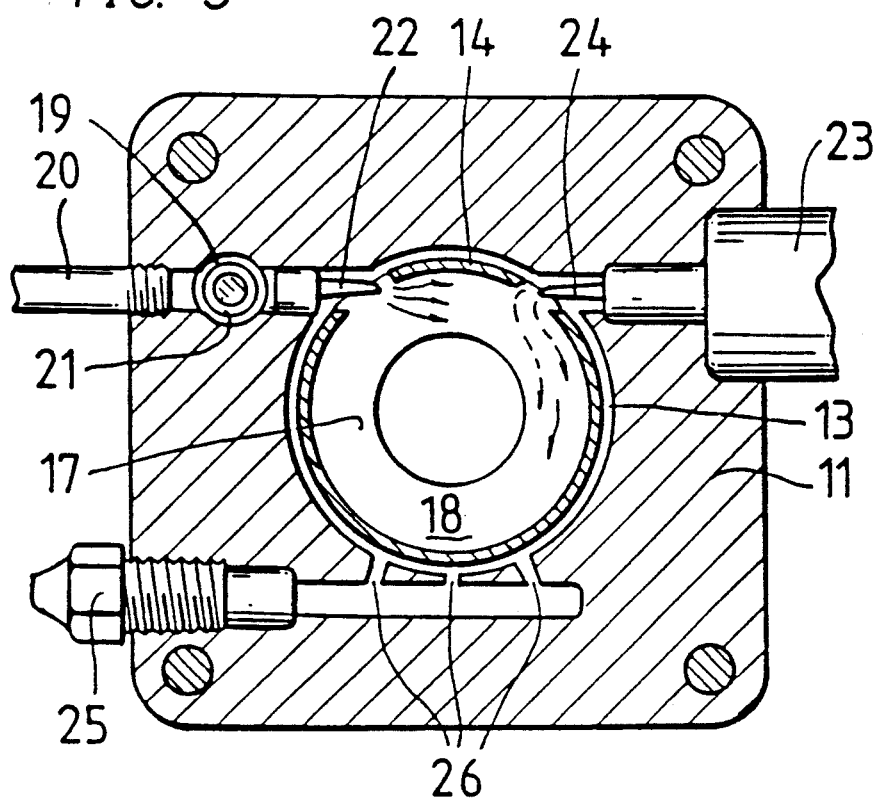
FIG. 3 is a cross section on line 3—3 of FIG. 2.
Figure 2:
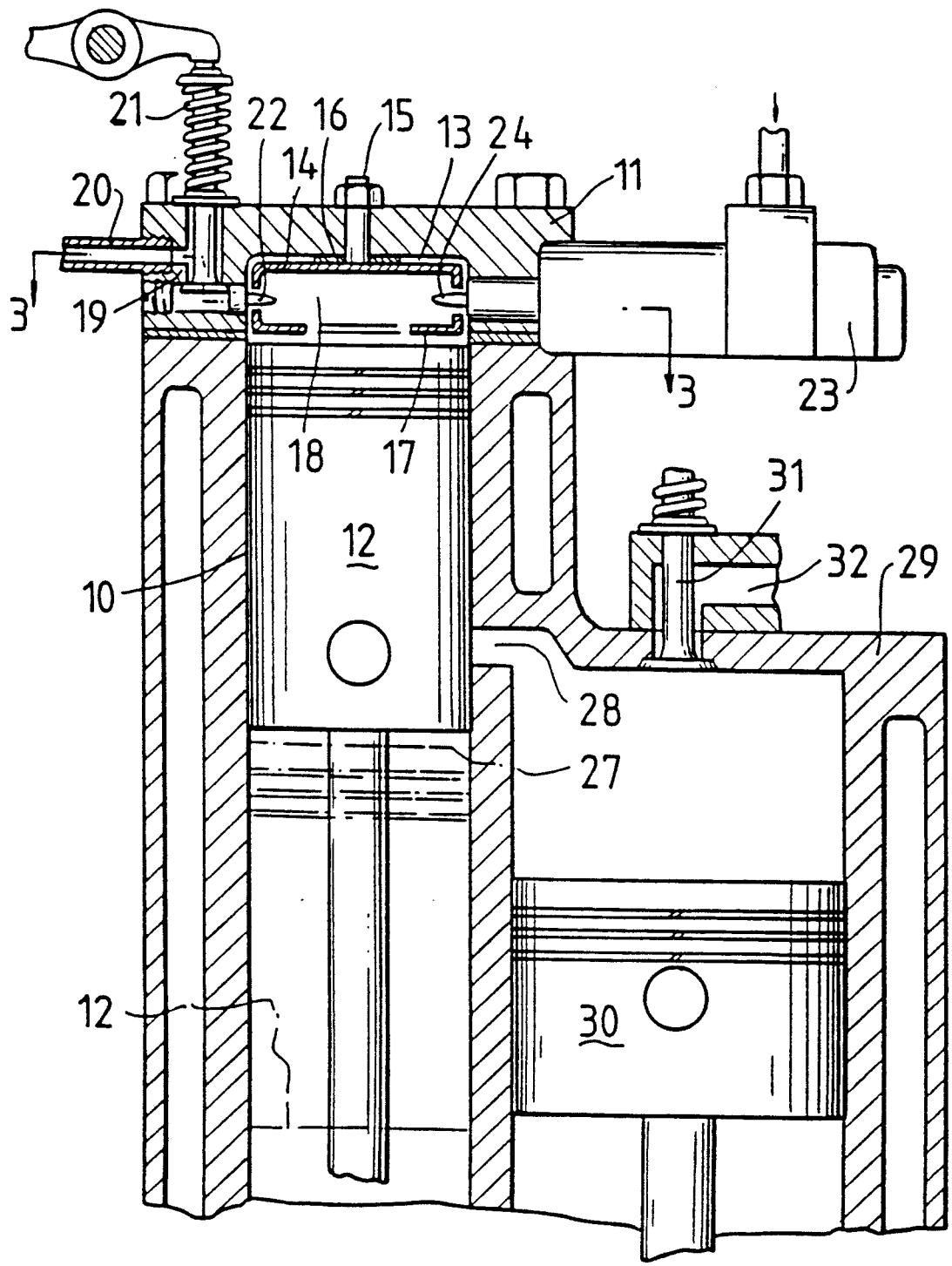
FIG. 2 is a sectional elevation of the firing cylinder, auxiliary cylinder and power pistons of an engine according to the present invention.

Referring now to FIGS. 2 and 3 of the drawings, which show an engine according to the present invention, a firing cylinder 10 is closed at the end remote from the crankshaft by a cylinder head 11.

The space within the cylinder 10 and head 11 extends beyond the limit of travel of a power piston 12 to leave an unswept region within the cylinder which constitutes the combustion chamber 13, A mixing and igniting dome 14 made from heat resistant metal or ceramic is retained within the combustion chamber 13 by a bolt 15 and heat resistant washer 16. The dome 14 is uniformly spaced from the end and side walls of the combustion chamber, for example by a distance of 0.5 mm, when the dome, cylinder 10 and head 11 are at their working temperatures. An inwardly directed flange 17 extends around the open end of the dome 14 to form a channel 18 around the interior of the dome.

It is essential that the dome is spaced from the walls of the combustion chamber. Therefore, during normal operating conditions, the dome does not touch the walls of the combustion chamber. Should the dome overheat and expand so as to contact the walls of the combustion chamber, the contact with the walls would cool the dome with the result that the dome would contract out of contact with the walls.

The preferred clearance is such, for example 0.5 mm in the engine being described, that the dome, should it reach temperatures at which it is liable to burn out, expands sufficiently to touch the walls of the combustion chamber to be thereby cooled to a temperature closer to that preferred.

An air inlet port 19 receiving air from the compressor through a pipe 20, is opened and closed by an inlet valve 21, and opens into an air injector nozzle 22 which extends through the side wall of the dome 14 into the channel 18. After the valve 21 closes, fuel from a conventional diesel fuel pump 23 is injected through nozzle 24 extending through the side wall of the dome 14 into the channel 18. As shown in FIG. 3, it is preferred that both nozzles 22 and 24 should be directed along the channel 18, but in opposite directions. The purpose of this arrangement is to break up any large fuel droplets and to ensure intimate mixing of the fuel and air, which then swirl around the channel 18.

When the engine is running, the heat of combustion maintains the dome 14 at the required temperature without any additional source of heat being required. In order to start the engine from cold, auxiliary means such as an electrically heated glow plug 25 of known construction is provided for facilitating ignition by heating at least a portion of the fuel/air mixture. Plugs of suitable kinds are described for example in the text book "The High-Speed Internal Combustion Engine" by Sir Harry R. Ricardo and J. G. G. Hempson, 5th Edition reprinted 1972, at pages 49 and 50. The plug 25 is located in the cylinder head 11 tangential to the combustion chamber 13 with which it communicates through three small passages 26. Portion of the fuel/air mixture penetrates the passages 26 and is ignited by the plug. This portion of the mixture then ignites the remainder. When the dome 14 has reached a sufficiently high temperature, the electricity supply to the plug may be turned off.

The injection of air through nozzle 22 and fuel through nozzle 24 is timed to occur when the power piston 12 is at or near top dead centre. Following ignition of the fuel/air mixture the piston 12 is driven to bottom dead centre to the position shown in dotted lines in FIG. 2. The top of the piston is then at the level indicated by the dotted line 27. Each downward stroke of the piston 12 is a power stroke.

For greater efficiency it is preferred that the pressure of the air admitted to the combustion chamber be several times as high, for example eight times as high, as the pressure reached in the compression stroke of a conventional Otto cycle engine. Air at a pressure of this order is supplied by a multi-stage, conveniently three- or four-stage, compressor comprising a plurality of compression cylinders connected in series and having reciprocating therein a compression piston connected to the same crankshaft as the power piston 12. As the length of the piston stroke is approximately the same as in the conventional engine, the pressure within the power cylinder at bottom dead centre will still be several atmospheres, so that allowing the gases to escape directly to the atmosphere would involve a considerable waste of the power made available by combustion of the fuel. This is avoided by allowing the burning fuel/air mixture to expand in two or more stages. In proceeding to bottom dead centre, the piston 12 uncovers a port 28 opening into the top of an auxiliary cylinder 29 located at the side of the cylinder 10. An auxiliary power piston 30 reciprocates within the cylinder 29 and is connected to the same crankshaft as the piston 12, the cycle of the piston 30 being considerably later than that of the piston 12. The cylinder 29 has a diameter much larger than that of the cylinder 10. For example, the diameter of cylinder 29 may be about three times the diameter of cylinder 10. In a motor car engine, suitable dimensions are 4 cm for the diameter of cylinder 10 and 11 cm for the diameter of cylinder 29.

As the piston 12 moves downwardly and uncovers the port 28, the piston 30 moves to the top of its stroke and the combustion chambers of the two cylinders are placed in communication, so that gases from the combustion chamber 13 enter the cylinder 29 and drive the piston 30 downwardly to supplement the power delivered by the piston 12. When the piston 12 moves upwardly by a sufficient distance to close the port 28, the cylinder 29 is isolated from the cylinder 10, and contains combustion gases at several atmospheres pressure. The piston 30 continues its downward travel aided by the pressure of the gases until it reaches its bottom dead centre. As the piston 30 then moves upwardly, an exhaust valve 31 located in the head of the cylinder 29 opens to permit the gases in the cylinder 29 to be expelled into the exhaust system 32 and thence to the atmosphere.

Because of the high temperatures involved, it is desirable to coat the top of the piston 12, and the port 28, with heat resistant material.

I claim:

1. An internal combustion engine comprising a firing cylinder and a separate compressor comprising a compression cylinder having reciprocating therein respectively a power piston and a compression piston connected to a common crankshaft, the firing cylinder extending beyond the top limit of travel of the power piston to thereby include an upswept space constituting a combustion chamber, characterized by:

a hollow dome located wholly within the combustion chamber with the closed top of the dome adjacent to the head of the firing cylinder and the open base of the dome nearer to the power piston, said dome being spaced from the walls of the combustion chamber;

means directing a charge of air from the compressor around the interior wall of the dome when the power piston is at or near the top dead centre;

means directing fuel separately from said air into the interior of the dome to mix with the air after all the air has entered the dome and while the power piston remains at or near top dead centre;

and auxiliary means for facilitating ignition for heating at least a portion of the fuel/air mixture when the temperature of the dome is insufficiently high for ignition.

2. An engine according to claim 1, further characterised by an inwardly directed flange extending around the open base of the dome to thereby form a channel around the interior of the dome.

3. An engine according to claim 2, further characterised in that the shape of the dome conforms to the shape of the end region of the combustion chamber and is uniformly spaced from the walls of the combustion chamber.

4. An engine according to claim 3 further characterised by an auxiliary firing cylinder of greater diameter than the first mentioned firing cylinder, transfer means opening into the interior of the firing cylinder above bottom dead centre of the power piston and into the interior of the auxiliary power cylinder adjacent the top thereof, an auxiliary power piston reciprocating on a cycle later than the cycle of the power piston within the auxiliary power cylinder and connected to the same crankshaft as the first mentioned power piston and the compression pistons, and exhaust means venting the auxiliary power cylinder to atmosphere when the auxiliary power piston is moving toward top dead centre.

* * * * *